Patented July 7, 1953

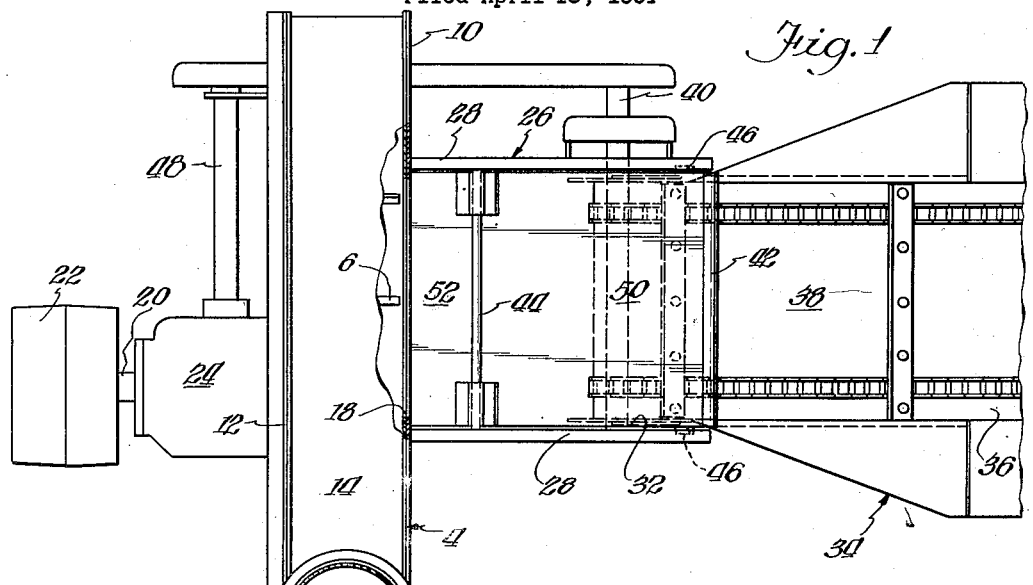

2,644,723

UNITED STATES PATENT OFFICE 2,644,723

FEEDING MEANS FOR BLOWERS

Edward J. Johnston, Chicago, Ill., assignor to International Harvester Company, a corporation of New Jersey Application April 18, 1951, Serial No. 221,671

15 Claims. (Cl. 302—37)

This invention relates to blowers and more particularly to improved feeding means for ensilage or forage blowers although not restricted thereto.

In general, such blowers comprise a fan device within a casing having an inlet opening and a discharge spout. The ensilage is delivered to the opening, sucked into the casing and centrifugally discharged into the spout. Proper operation requires substantially uniform feeding which normally is not readily available with ensilage such as hay or alfalfa which tends to bunch and become tangled thus choking and overloading the mechanism and causing backfeeding, stoppages and the like.

A general object of the invention is to provide a novel automatic self-clearing feed control for the blower.

A more specific object is to devise a feeding means including a throat or feed passage with a gate or baffle so arranged as to automatically constrict the throat passage when choking is due to occur and to simultaneously open a port allowing admittance of air necessary to support continued blowing operation, the lack of which would cause failure of blower resulting in a plugged pipe.

A further object is to devise such a control which is of extremely simple form, inexpensive and readily adaptable to blowers currently in use.

These and other objects of the invention will become more apparent from the specification and the drawings, wherein:

Figure 1 is a top plan view of a blower and conveyor assembly incorporating the invention, and Figure 2 is a side elevational view thereof with a portion of the near side panel of the throat broken away and parts shown in vertical cross-section.

Describing the invention in detail, the blower generally indicated 2 comprises a casing or fan housing 4 which contains a fan 6 of the conventional peripheral discharge type. The housing 4 is mounted on skids 8 and includes substantially vertical side walls 10 and 12 interconnected by a circumferential web 14 to form a fan drum, from the upper side of which, connected to web 14, projects a discharge conduit or spout 16 adapted to extend to the upper end of a farm silo, for example. The side wall 10 is provided with a substantially central feed opening 18. A shaft 20 extends outwardly of side wall 12 and is provided with a belt pulley 22 adapted to be driven as by a belt running from a tractor as will be readily understood by those skilled in the art. The shaft 20 is operatively connected to the fan 6 for driving the same.

A receiving hopper or chute generally designated 26 is positioned adjacent to the feed opening 18 and comprises a pair of laterally spaced substantially vertical side sheets or panels 28, 28 which extend substantially perpendicular to the side wall 10 and are connected thereto along their inner edges at opposite sides of the opening 18. The side members 28, 28 are connected adjacent to their lower ends to the lateral edges of a bottom panel 30 which is angled upwardly from the lower edge of the opening 18, said panel having its lower inner edge connected to the wall 10. The vertical side members 28, 28 and the inwardly downwardly sloping bottom portion 30 define a feed throat 32 into which a feed mechanism, generally designated 34, discharges, said feed mechanism including the trough 36 carrying an endless apron 38, the trough being hinged as by a shaft 40 on a substantially horizontal axis to the side members 28, 28. This construction is substantially the same as that shown in U. S. Patent 2,532,064 issued to E. F. Huddle. It will be seen that the inner or discharge end of the feed mechanism is positioned within the throat 32 above the sloping panel 30.

The feature of the present invention is the provision of an automatic control valve for the feed into the inlet 18, and comprises butterfly valve means in the form of a baffle plate or flap 42 which is disposed to form an upper portion of the throat, said plate or gate extending between the side portions 28, 28 and having a width substantially equal to that of the throat. The plate is pivoted intermediate its ends as by an axle 44 extending substantially perpendicular to the portions 28, 28 and connected thereto. In normal position, the plate 42 extends diagonally upwardly toward the inlet end of the feed throat 32 and in this position has its lower inner or trailing edge seated against or positioned closely adjacent to the wall 10 immediately above the upper edge of the opening 18. The plate seats adjacent to its upper outer or leading edge on stops or abutments 46, 46 located on the interior sides of the panels 28, 28 and herein shown as comprising nuts on bolts fastened to the plates 28, 28.

In operation, the conveyor is actuated through a drive rigging 48 leading from the gear box 24 and connected to the before-mentioned shaft 40 which forms part of the endless apron drive structure. The ensilage is deposited into the trough on the apron as from a wagon and is delivered to the throat 32 beneath the baffle plate 42. At capacity delivery to the throat the baffle plate remains in the inclined position shown in Figure 2 and directs the air currents thereunder across the top of the entering material in the direction of its movement. Immediately upon the entry of a pile or volume of material greater than the capacity area of the throat, the plate is rotated upwardly ahead of its axis of pivot by said material whereby the upper or gauge portion 50 of the plate bears against the material and the lower inner portion 52 below the axis of pivot swings away from the wall 10 and constricts the throat 32 by moving below the upper edge of said opening toward the bottom panel 30 of the throat. This reduces the amount of material flowing into the opening 18. In its raised position as shown in dotted lines in Figure 2, the plate defines with its top side and adjacent portions of panels 28, 28 and the portion of wall 10 extending between the panels 20, 20, an air passage or channel 54 through which air is drawn by the fan diagonally downwardly across the top of the material issuing into the opening 18 beneath the lower edge of the plate 42. This provision supplies the air necessary to prevent choking and the top side of plate 42 directs the air in such manner that it accelerates feeding of the material into the casing, while at the same time fluffing the material. This condition exists until a normal flow is again established whereupon the plate, because of the longer length and greater weight of its upper outer portion 50 is biased downwardly gravitationally in a direction causing the portion 50 to move downwardly until the plate abuts the stops 46, 46. This position of the plate increases the feed area to the maximum and closes the passage 54 because portion 52 is moved upwardly whereby the air is again channeled below the plate across the top of the material and into the inlet opening. It will be readily apparent that this mechanism is automatically responsive and in proportion to the condition desiring correction, that is, it prevents overload into the inlet opening and consequent choking of the mechanism.

The arrangement herein described has been continuously tested under a series of extreme adverse conditions and has performed exceedingly well.

It will be understood that in the present construction, the biasing of the baffle plate to its normal position is established gravitationally, however the plate may be biased by resilient means if desired.

It will also be noted that elevation of the conveyor 34 is accommodated as shown in phantom lines in Figure 2 to permit positioning of the loading wagon or for storage as described in the before-mentioned patent. As the conveyor 34 is telescoped into the throat, the outer edge of the plate is caused to slide on the top side of the conveyor and advanced into the throat ahead of the same.

What is claimed is:

1. In a feed for a material blower having a material inlet opening, baffle means supported in the path of the material flowing into the opening and directly engageable and automatically movable thereby across the opening to vary the material accepting area thereof while simultaneously uncovering the remaining area of the opening to the entry of air.

2. In a feed for a material blower having a material inlet opening, a baffle pivoted adjacent to said opening, said baffle being arranged to swing across said opening to vary the area thereof adapted to receive the material while simultaneously uncovering the remaining area of the opening to the entry of air.

3. In an automatic feed control for a material blower having a material inlet, baffle means pivotally supported adjacent to the inlet and arranged to swing across said inlet to vary the area thereof adapted to receive the material while simultaneously uncovering the remainder of the inlet to the entry of air, said baffle means being arranged to direct the air diagonally toward the material in the direction of flow thereof immediately before its entry into the inlet.

4. In a centrifugal blower comprising a casing with a material receiving inlet opening, and a valve structure at said opening responsive to overloads for automatically constricting the area of the inlet to the acceptance of the material while simultaneously proportionately opening the inlet to the entry of air.

5. In a blower having a casing with a feed opening, a trough shaped chute extending from said casing for guiding material to said feed opening, and a baffle pivotally mounted across the open top side of the chute so as to extend in normal position diagonally upwardly from the upper limit of said opening and with its inner extremity disposed at the upper edge of the opening, and means pivoting said baffle intermediate its inner and outer edges on an axis accommodating swinging of the baffle in a direction bringing said inner extremity of the baffle toward the material in the chute to constrict its flow into the opening and away from said casing to form an air inlet with the casing directing the air to issue across the material immediately before its entry into the feed opening.

6. In a material blower having a casing with an inlet opening, a trough shaped chute having spaced sides and a bottom arranged to deliver to the opening, a baffle plate extending between said sides and spaced above the bottom and in normal position disposed with its inner edge against the casing and extending diagonally upwardly outwardly, conveyor means discharging into the chute between the baffle and said bottom, and pivot means mounting said baffle on an axis intermediate the inner and outer extremities thereof and located closer to the inner extremity of the baffle than to said outer extremity thereof whereby said baffle is adapted to be elevated at its outer portion by the material when above the normal level of said outer portion to cause said baffle to swing its inner portion downwardly in the path of the material to reduce its feed into the inlet and to open a port back of the baffle to provide an air inlet for the feed opening.

7. In a material blower, a fan housing having a feed opening in a side thereof, a throat communicating with the opening and including a pair of substantially vertical side panels flanking the opening, a conveyor having its discharge end positioned between said panels and hingedly connected thereto to permit substantially vertical swinging movements of the conveyor from approximately horizontal operating position to upright folded position whereat the discharge end portion is telescoped into the throat between the panels, and baffle means pivoted to the panels on an axis generally parallel to the swinging axis of the conveyor and arranged to slide against the conveyor end portion and to be rotated thereby to a position ahead of the same as it gains entry between said panels when the conveyor is being folded, the axis of pivot of the baffle means being located intermediate the ends thereof, and said baffle means in said operating position of the conveyor having one end abutting said side of the blower above said opening and at its opposite end overhanging the conveyor, said baffle means in the upright position of the conveyor having been rotated substantially vertically whereat said one end thereof is disposed below the upper margin of the feed opening and spaced in front thereof, said baffle means in said last mentioned position thereof defining an air passage between the same and said side of the blower and adapted to be maintained in said position by material gravitationally discharged from the conveyor into the chute when the conveyor is being folded from horizontal to upright position, whereby as the blower is operated after lowering, initial overloading is precluded.

8. In an ensilage blower having a casing with an inlet opening, a throat extending outwardly from the opening and having spaced sides and a bottom, a conveyor extending into the throat above said bottom, a baffle plate above the conveyor and pivoted intermediate its ends to said sides and arranged with the conveyor in converging relationship toward said opening, said baffle plate having a leading portion disposed outwardly of its axis of pivot and a trailing portion inwardly of said axis, said leading portion being of greater area and weight than said trailing portion whereby biasing said plate in a direction urging said leading portion toward said conveyor, and the trailing portion against said casing over said opening whereby the opening is fully open.

9. A combination according to claim 8 wherein stop means are provided engageable with said plate for limiting movement of said leading portion toward the conveyor.

10. In a material blower having a casing with an inlet, material directing means for guiding the material toward said inlet and including a baffle element on at least one side thereof and arranged substantially in a butterfly valve with respect to the inlet and in normal position having an inner extremity disposed adjacent to the casing and extending diagonally outwardly therefrom and pivoted intermediate its inner and outer extremities and arranged to pivot under predetermined conditions in a manner constricting the material directing means while opening said inlet to the entry of air.

11. In a material blower including a casing with an upright wall having an inlet opening, a trough for guiding material into the opening extending from said wall comprising spaced side panels and an intervening bottom panel connected to said wall, baffle means extending in normal position diagonally upwardly above said opening between said panels and presenting a material engaging surface on its bottom side, said side panels extending upwardly from the baffle means and with a portion of the casing above the opening and top side of the baffle means forming an air chute closed by said baffle means in normal position, said baffle means being movably mounted so that when engaged on its material engaging side by an overload of material entering the trough shifting to a position opening the air chute to the upper part of the inlet opening and extending diagonally thereto for directing an air stream across the material entering the opening from beneath the baffle means.

12. In a material blower having an inlet, means for delivering the material to the inlet, and baffle means mounted to provide a substantially butterfly valve with respect to the inlet and dividing said inlet into several variable areas one adapted to receive the material and another providing an air passage, the relative sizes of said areas being the function of the position of the baffle means.

13. In a material blower, a fan casing having a feed inlet in a side thereof, a receiving housing adjacent said feed inlet, said receiving housing including laterally spaced vertical members connected by a bottom portion to form a feed throat in communication with said inlet, a baffle plate between said members and extending in normal position from said casing above the inlet diagonally upwardly outwardly, said baffle plate in said normal position directing air with its bottom side into the inlet above the top of the material entering the throat, said plate being pivoted intermediate its inner and outer margins and having a larger material engaging area outwardly of its axis of pivot than inwardly thereof, said plate being pivotal by the material wedging under said plate to rotate the same and moving its inner margin away from the casing toward said bottom portion to constrict the area of the throat and simultaneously to form an air port communicating with said inlet whereup the air is channeled over the top of said baffle plate.

14. The combination according to claim 13, and means for returning said plate to said normal position whenever normal delivery is established.

15. In an ensilage blower or the like, a fan housing having a feed opening in a side thereof, a throat structure for the opening and including a bottom panel extending diagonally upwardly from the lower edge of the opening, substantially vertical side plates joined at their inner edges to the adjacent side of the housing and adjacent to their lower portions to the lateral edges of the bottom panel, a baffle spanning the space between the upper portions of the side plates and in normal position sloping upwardly outwardly from said side of the housing and having its inner lower edge disposed above the opening in close proximity or contact with said side of the housing, means pivoting the baffle intermediate its ends from said side plates, a conveyor having an endless apron converging with the baffle toward the opening and passing beneath the baffle for discharging into the throat structure, said baffle being pivotal under overload conditions in a direction moving the section thereof above its axis of pivot away from said apron whereupon the section thereof below the axis is moved toward the apron in front of the upper part of said opening to constrict the same, and to open the upper part of the feed opening to the entry of air.

EDWARD J. JOHNSTON.

References Cited in the file of this patent

UNITED STATES PATENTS

| Number | Name | Date |
|---|---|---|
| 635,112 | Wheildon | Oct. 17, 1899 |
| 884,016 | Groves | Apr. 7, 1908 |
| 1,294,397 | Carson | Feb. 18, 1919 |
| 1,450,903 | Newhouse | Apr. 3, 1923 |
| 1,512,322 | Wallace | Oct. 21, 1924 |
| 2,340,983 | Pfeiffer | Feb. 8, 1944 |
| 2,450,053 | McCarty | Sept. 28, 1948 |
| 2,532,064 | Huddle | Nov. 28, 1950 |

FOREIGN PATENTS

| Number | Country | Date |
|---|---|---|
| 333,118 | Great Britain | Aug. 7, 1930 |